US012568115B2

(12) United States Patent
Hu et al.

(10) Patent No.: US 12,568,115 B2
(45) Date of Patent: Mar. 3, 2026

(54) CONTENT-BASED DEEP LEARNING FOR INLINE PHISHING DETECTION

(71) Applicant: Palo Alto Networks, Inc., Santa Clara, CA (US)

(72) Inventors: Lucas Mingyuan Hu, Palo Alto, CA (US); Seokkyung Chung, Sunnyvale, CA (US); Jingwei Fan, Chapel Hill, NC (US); Wei Wang, Milpitas, CA (US); Brody James Kutt, San Jose, CA (US); William Redington Hewlett, II, Mountain View, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 720 days.

(21) Appl. No.: 17/661,370

(22) Filed: Apr. 29, 2022

(65) Prior Publication Data

US 2023/0353595 A1 Nov. 2, 2023

(51) Int. Cl.
*H04L 9/40* (2022.01)
*G06N 20/00* (2019.01)

(52) U.S. Cl.
CPC ...... *H04L 63/1483* (2013.01); *H04L 63/0236* (2013.01); *H04L 63/1425* (2013.01); *G06N 20/00* (2019.01)

(58) Field of Classification Search
CPC ............. H04L 63/1483; H04L 63/0236; H04L 63/1425; G06N 20/00
See application file for complete search history.

(56) References Cited

U.S. PATENT DOCUMENTS

| | | | | |
|---|---|---|---|---|
| 10,834,128 | B1 * | 11/2020 | Rajagopalan | ......... H04L 51/212 |
| 11,165,822 | B2 * | 11/2021 | Hunt | ................... H04L 63/1433 |
| 11,310,270 | B1 * | 4/2022 | Weber | ................... G06F 21/566 |
| 2010/0186088 | A1 * | 7/2010 | Banerjee | ............. H04L 63/1433 |
| | | | | 709/224 |
| 2014/0033307 | A1 * | 1/2014 | Schmidtler | ......... H04L 63/1483 |
| | | | | 726/22 |
| 2020/0036750 | A1 * | 1/2020 | Bahnsen | ............. H04L 63/1416 |
| 2020/0351242 | A1 * | 11/2020 | Huang | ..................... G06N 7/01 |
| 2021/0099485 | A1 * | 4/2021 | Lancioni | ................. H04L 67/02 |
| 2021/0203692 | A1 * | 7/2021 | Nunes | ................. H04L 63/1483 |
| 2021/0203693 | A1 * | 7/2021 | Clausen | ............. H04L 63/1425 |
| 2021/0377303 | A1 * | 12/2021 | Bui | ......................... G06F 40/14 |
| 2023/0188563 | A1 * | 6/2023 | Sircar | ................. H04L 63/1466 |
| | | | | 726/1 |

* cited by examiner

*Primary Examiner* — Theodore C Parsons
*Assistant Examiner* — Alan L Kong
(74) *Attorney, Agent, or Firm* — Gilliam IP PLLC

(57) ABSTRACT

An inline and offline machine learning pipeline for detection of phishing attacks with a holistic, easily upgradeable framework is presented herein. A packet analyzer records capture logs of network traffic between an endpoint device and a firewall. A parser extracts inputs from the capture logs inline that it communicates to one of an inline model and an offline model for phishing detection. The inline model and offline model are neural networks with parallelizable network architectures that do not depend on handcrafted inputs. The inline model operates inline with the packet analyzer and parser and makes fast phishing attack classifications based on inputs generated from capture logs. The offline model uses additional inputs such as inputs generated from network logs to make phishing attack classifications.

20 Claims, 8 Drawing Sheets

CONTENT-BASED DEEP LEARNING FOR INLINE PHISHING DETECTION

BACKGROUND

The disclosure generally relates to computing arrangements based on specific computation models (e.g., CPC G06N) and using neural network models (e.g., CPC G06N3/04).

Phishing is a commonplace cyberattack that attempts to deceive users into revealing sensitive/personal information by manipulating how responses to Uniform Resource Locator (URL) queries are presented to users. Phishing attacks often mimic trusted sources such as trusted email addresses, websites, etc. Over the Internet, phishing frequently involves URL manipulation where URLs are made to resemble trusted URLs (e.g., example.net vs example.com). Detection of phishing cyberattacks occurs through analysis of user-presented content such as HyperText Transfer Protocol (HTTP) responses in addition to metadata fields and data structures such as (among others) HTTP header fields and Document Object Model (DOM) trees, respectively.

BRIEF DESCRIPTION OF THE DRAWINGS

Aspects of the disclosure may be better understood by referencing the accompanying drawings.

DESCRIPTION

Figure 1:
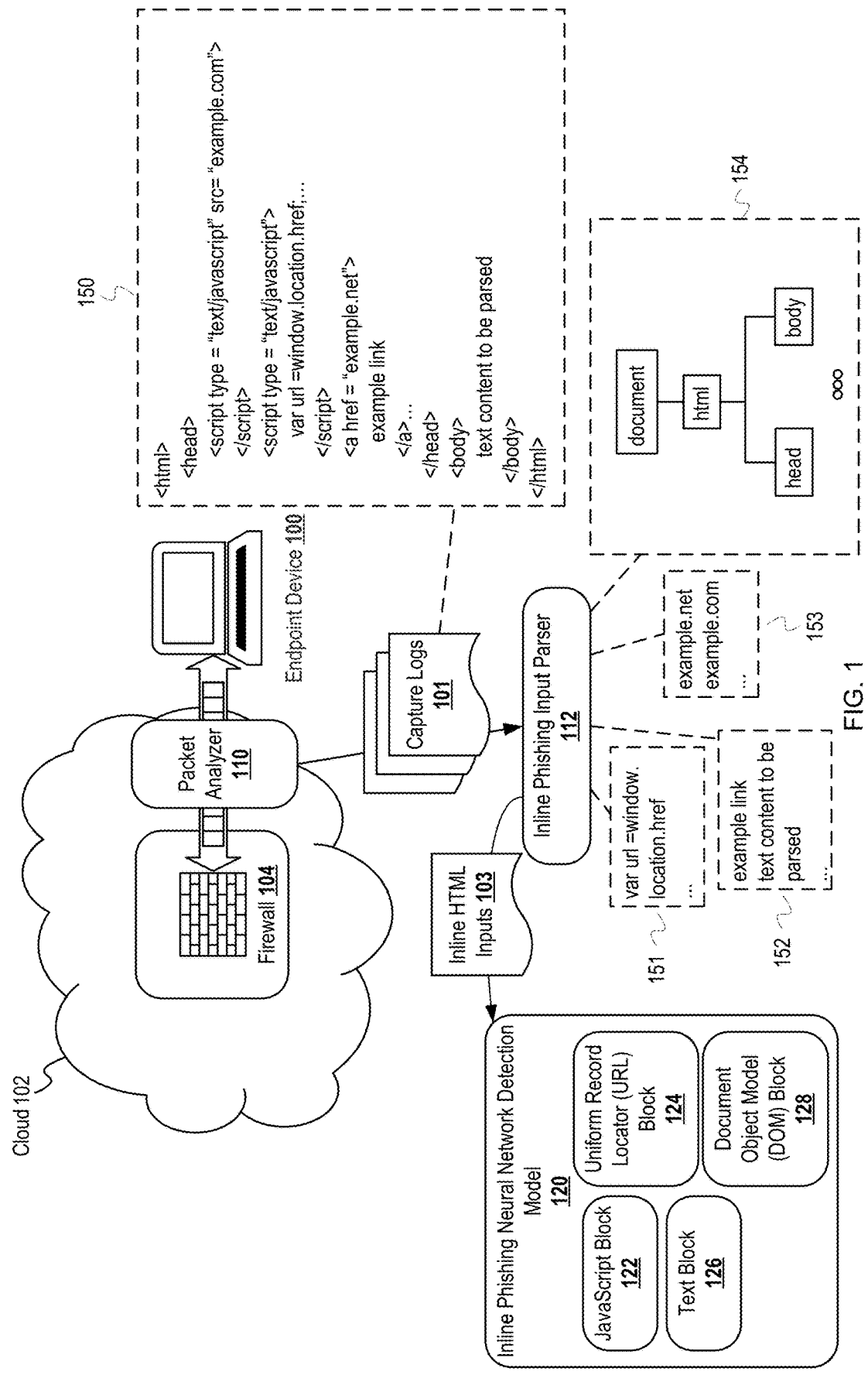
FIG. 1 is a schematic diagram of an example system of input generation for an inline phishing detection model.

The description that follows includes example systems, methods, techniques, and program flows that embody aspects of the disclosure. However, it is understood that this disclosure may be practiced without these specific details. For instance, this disclosure refers to inline and offline phishing detection using a machine learning pipeline including neural networks that take as inputs various inline inputs generated from capture logs of network traffic between endpoint devices and firewalls and inputs generated from network logs in illustrative examples. Aspects of this disclosure can be instead applied to detection of other types of malicious cyberattacks (e.g., man-in-the-middle attacks, Address Resolution Protocol (ARP) spoofing attacks, smurfing attacks, etc.) using an equivalent machine learning pipeline with inline and offline configurations. In other instances, well-known instruction instances, protocols, structures and techniques have not been shown in detail in order not to obfuscate the description.

Overview

Typical machine learning phishing detection models either generate classifications using a deep learning architecture that uses a specific subset and/or characteristics ("signal") of user-presented content as input or generate large amounts of handcrafted features that are thrown into bloated detection models leading to inefficiency in generating classifications and performing model updates and leading to rigidity of classifications using these handcrafted features. Lack of breadth in inputs and inefficiency in classifications and model updates both provide deficiencies when detecting zero-day phishing exploits and URL redirects (among other phishing attacks) that can quickly guide users to provide sensitive information before a detection model can intervene. A neural network phishing detection model (hereinafter "detection model") is presented herein that operates on inputs across multiple signals of user-presented content and can make detections inline as user-presented content is received. Moreover, the detection model is efficiently parallelizable and does not involve hand crafted features that would provide various inefficiencies.

Inputs including JavaScript® code, text in HTTP responses, URLs, redirects, HTTP headers, links, and DOM trees are fed into separate blocks of the detection model. Each block is a convolutional neural network (CNN) that is capable of running in parallel with every other block. Outputs of the blocks are grouped into a dense block that generates a probability value that phishing is occurring. The detection model is an end-to-end neural network so that internal layers including the CNN blocks, the dense block, and input layers for preprocessing inputs are trained simultaneously during backpropagation. This allows the detection model to learn patterns of characteristics across signals (i.e., inputs to the various blocks) for improved phishing detection. Moreover, in response to detection of phishing and/or false negatives/positives, an input importance analyzer feeds masked input vectors into the detection model that zero out specific inputs (signals) to determine which inputs had the greatest importance to the generated classification based on corresponding importance scores. These importance scores can be presented to both users and domain-level experts to identify which inputs were most heavily correlated to phishing attack instances and which inputs contributed to false negatives/positives.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Illustrations

Figure 2:
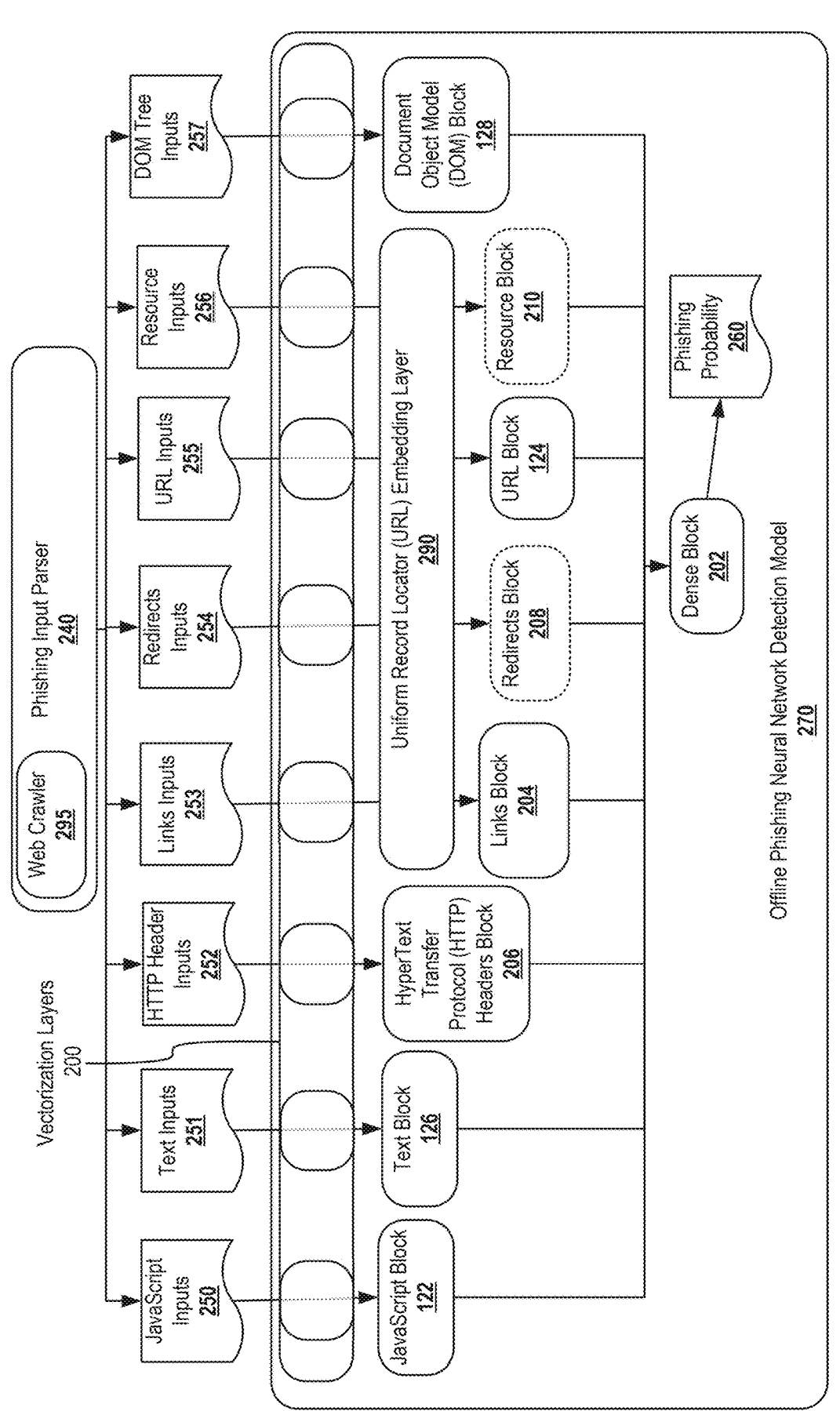
FIG. 2 is a schematic diagram of an example neural network architecture for an offline phishing detection model.

FIGS. 1 and 2 are schematic diagrams that include different phishing detection model architectures. The model architecture depicted in FIG. 1 is lighter/less complex than the model architecture depicted in FIG. 2.

FIG. 1 is a schematic diagram of an example system of input generation for an inline phishing detection model. A packet analyzer 110 monitoring traffic between an endpoint device 100 and a firewall 104 on a cloud 102 records capture logs 101 comprising HTTP responses responsive to HTTP GET requests to URLs from the endpoint device 100. An inline phishing input parser 112 (hereinafter "parser 112") extracts inline HTML inputs 103 from the capture logs 101 that the parser 112 communicates to an inline phishing neural network detection model 120 (hereinafter "detection model 120"). The detection model 120 then makes a classification of an entity corresponding to an HTTP response (e.g., a resource associated with a URL for the HTTP response) recorded in the capture logs 101 that indicates a probability value of a phishing attack.

The packet analyzer 110 can be any system configured to record capture logs 101 at a data plane layer or other low-level layer in the Open Systems Interconnection model (OSI) model for communications between the firewall 104 and the endpoint device 100 across the cloud 102. For instance, the packet analyzer 110 can be executed on a network router that functions as an Internet gateway that routes ingress and egress network traffic for firewalls in the cloud 102 monitoring various endpoint devices including the endpoint device 100. The packet analyzer 110 records Packet Capture (PCAP) files or PCAP Next Generation (PCAPNG) files to the capture logs 101. The PCAP or PCAPNG files are in a standardized format that enables the parser 112 to extract inputs accordingly. Although depicted as separate components to indicate their distinct functionality, functionality of the packet analyzer 110, the parser 112, and the detection model 120 can all run on a same component (e.g., a network router at an Internet gateway for the cloud 102) for optimized efficiency of phishing detection. Thus, the parser 112 parses the capture logs 101 inline in a single pass as they are recorded by the packet analyzer 110 and, after the single inline pass of the capture logs 101, the parser 112 immediately communicates the inline HTML inputs 103 to the detection model 120 via a low latency (local) network connection to make a classification.

An example capture log 150 comprises the following HTML code:

```
<html>
    <head>
        <script type = "text/javascript" src= "example.com">
        </script>
        <script type = "text/javascript">
            var url =window.location.href; . . .
        </script>
        <a href = "example.net">
            example link
        </a> . . .
    </head>
    <body>
        text content to be parsed
    </body>
</html>
```

As each line of the HTML code is recorded by the packet analyzer 110, the parser 112 receives a stream of characters comprising the HTML code (in addition to characters in other content contained in an HTTP response comprising the HTML code).

Based on indications in a HTTP header that the content is HTML code (e.g., as indicated in a Content-Type HTTP header field for the example capture log 150), the parser 112 parses the HTML code in the example capture log 150 according to an HTML configuration. For instance, the parser 112 can determine the instantiation and termination of HTML elements based on the opening tag "< . . . >" and closing tag "</ . . . >". The parser 112 can then construct a DOM tree such as example DOM tree 154 based on instantiation and termination of HTML elements in a depth first tree traversal by adding a child node of the current node in the DOM tree at instantiation and traversing to a parent node in the example DOM tree 154 at termination. To exemplify, the parser 112 can initialize an empty DOM tree with a node labelled "document" representing the entire HTML document. Then, on detecting the "<html>" opening tag, the parser 112 can add a child node labelled "html" to the "document" node representing the HTML element and traverse a data structure representing the tree to the "html" node for generation of children nodes representing data element of the HTML element (i.e., data elements that proceed the opening tag of the HTML element in the example capture log 150). The parser 112 can add a "head" node as a child to the "html" node representing the head element and traverse the tree data structure to the "head" node based on detecting the "<head>" opening tag. Then, parser 112 adds a "script" node representing the first script element as a child node of the "head" node, traverses to the "script" node, and, based on the "</script>" closing tag, the parser 112 traverses back to the parent "head" node (i.e., the node with an opening tag that closest precedes the closing tag of the "script" node in the example capture log 150). This process continues in a depth first traversal until the parser 112 traverses to the "document" node based on the "</html>" closing tag at the end of example capture log 150. Each node can have additional labels corresponding to metadata in opening tags such as tags, links, etc. that, in some embodiments, are stored as child nodes in a DOM tree data structure. Note that the example DOM tree 154 is a graphical representation of a DOM tree (for instance, as rendered by a graphical user interface (GUI)), whereas a DOM tree input generated by the parser 112 will comprise a string having functional syntax (e.g., according to a tree data structure) that indicates when a child node is generated, when traversal goes upwards to a parent node, etc. in a DOM tree (or, alternatively, a list of nodes and their respective children and parent nodes).

Additionally, the parser 112 can record text inputs, JavaScript code inputs (hereinafter "JavaScript inputs"), and URL inputs based on metadata indicated during instantiation of HTML elements. For instance, the "<script type="text/javascript" src="example.com">" indicates a URL "example.com" that is recorded by the parser 112 in example URL inputs 153. While the URL "example.com" is recorded for inline configurations, JavaScript code is queried from this URL with a Web crawler in offline configurations, and in these offline configurations the JavaScript code is included in a JavaScript input and the URL is included in a resource input. The "<script type="text/javascript">" header indicates subsequent JavaScript code that is recorded by the parser 112 as the string "var url=window.location.href" in example JavaScript inputs 151. The "<a href="example.net">" header indicates a link to the URL "example.net" that is also recorded in the example URL inputs 153. The "example link" and "text content to be parsed" lines that are bookended by respective HTML elements indicate text content that is recorded by the parser 112 as strings "example link" and "text content to be parsed" separated by a new line character in example text inputs 152. Note that the example inputs 151-154 can be recorded inline in a single pass as the parser 112 receives the example capture log 150. Each input in the inline HTML inputs 103 can be truncated based on a maximal input length for corresponding blocks at the detection model 120.

The detection model 120 receives the inline HTML inputs 103 such as example inputs 151-154 and makes a classification comprising a probability value that a phishing attack is associated with the inline HTML inputs 103. The detection model 120 comprises a JavaScript block 122, a URL block 124, a text block 126, and a DOM block 128 that receive respective example inputs 151, 153, 152, and 154 as inputs after processing at various input layers. Each of the blocks 122, 124, 126, and 128 is a CNN comprising convolutional layers, pooling layers, flattening layers, etc. The detection model 120 can include additional blocks such as a links URL block (not depicted). Blocks such as URL-related blocks can share embedding layers in the internal architecture of the detection model 120. The use of "block" herein refers to one or more layers in a neural network such that each block is a separate sub-neural network of a neural network (e.g., the detection model 120) that takes input and generates output without interacting/feeding inputs/outputs into other blocks. As such, each block is capable of being trained and deployed in isolation and certain blocks can run in parallel. A neural network like the detection model 120 thus comprises an ensemble of blocks, where inputs/outputs of each block are fed into other blocks according to the architecture of the ensemble.

FIG. 2 is a schematic diagram of an example neural network architecture for an offline phishing detection model. Offline phishing neural network detection model 270 (hereinafter "detection model 270") receives various inputs from a phishing input parser 240 (hereinafter "parser 240") and, after various operations at internal layers of the detection model 270, outputs a phishing probability 260 comprising a probability value that phishing is indicated in the inputs generated by the parser 240. The parser 240 receives capture logs, network logs of network traffic, and additional capture logs recorded in HTTP responses to a Web crawler 2950 and generates inputs including JavaScript inputs 250, text inputs 251, link inputs 252, HTTP header inputs 252, redirects inputs 254, URL inputs 255, resource inputs 256, and DOM tree inputs 257.

The inputs 250-257 are first input through vectorization layers 200. Each of the input layers in the vectorizations layers 200 comprises a text vectorization layer that converts strings in the inputs 250-257 into (numerical) embedding vectors. For instance, each input layer in the vectorization layers 200 corresponding to each of the inputs 250-257 can feed into a layer that parses inputs including removing punctuation and converting to lowercase, generates n-gram tokens from the remaining strings, indexes the tokens with unique integers, and transforms the indexed tokens into a vector of integers using the indices (e.g., according to the Keras implementation of the tf.keras.layers.TextVectorization layer for the TensorFlow® library). The outputs of the text vectorization layers feed into lambda function layers in the vectorization layers 200. The lambda function layers format the vectorized tokens so that they can be input into further layers in the detection model 270.

Each of the JavaScript block 122, the text block 126, an HTTP header block 206, and the DOM block 128 receives the inputs 250, 251, 252, and 257, respectively, after feeding through the respective layers in the vectorization layers 200. Each of the blocks 122, 126, 206, and 128 comprises an embedding layer that converts vectors of token indices into (numerical vector) embeddings such that semantic similarity between the indexed tokens is preserved in the embedding space. Additionally, each of the inputs 253-256 feed into a URL embedding layer 290 that also converts vectors of token indices into embeddings. Note that while the layers in the vectorization layers 200 are distinct (i.e., distinct blocks) for each of the inputs 250-257, the inputs 253-256 all further feed into a same embedding layer (block) 290 after the corresponding ones of the vectorization layers 200. These inputs 253-256 all comprise strings of URLs, which have a same meaning (i.e., resource locators). Therefore, The URLs are embedded according to the same embedding. Each of a links block 204, a redirects block 208, a URL block 124, and a resource block 210 receives inputs 253, 254, 255, and 256, respectively, after feeding through the vectorization layer 200 and the URL embedding layer 290.

The JavaScript inputs 250 correspond to JavaScript code indicated in HTTP responses in network traffic between a firewall and an endpoint device (e.g., as indicated in a Content-Type HTTP header field). Text inputs 251 correspond to text content in HTTP responses such as text that is rendered in a web browser. The HTTP header inputs 252 correspond to fields indicated in HTTP header fields of HTTP GET requests, HTTP responses, etc. in network traffic. The links inputs 253 correspond to URLs in links (e.g., as indicated by "<a href= . . . >" syntax in HTML). The redirects inputs 254 correspond to redirects that occur based on HTTP responses sent to an endpoint device (not depicted). The URL inputs 255 correspond to URLs contained in HTTP responses not associated with redirect URLs and link URLs (e.g., the queried URLs themselves). The resource inputs 256 correspond to resources associated with queried URLs. The parser 240 can maintain a chain of URL redirects based on previous redirects at the endpoint device and can also maintain and/or access an index of resources that includes metadata such as associated URLs. When generating the resource inputs 256, the parser 240 can query and/or access the index of resources with the chain of redirect URLs to determine uniform resource identifiers (URIs) to be included. Finally, the DOM tree inputs 257 comprise a data structure containing a tree corresponding to DOM model structure of HTML code (or other markup language code) indicated in HTTP responses.

In offline configurations, the Web crawler 2950 scans capture logs and queries any URLs indicated in the packet logs to get additional HTTP responses that are themselves captured and included in the inputs 250-257. For instance, the Web crawler 2950 can query a URL indicated in an HTML document element as having JavaScript code, Cascading Style Sheets (CSS) code, image data, etc. Returned JavaScript code can be included in JavaScript inputs 250. The Web crawler 2950 can identify resource URLs to include in the resource inputs 256 by rendering HTTP responses in a browser and performing image detection on the rendered browser. Image data from rendering browsers can be included in an additional image input (not depicted). The Web crawler 2950 queries URLs according to an internal selection policy that can prioritize URLs indicated in capture logs.

The inputs 250-257 can be generated according to concatenation and formatting on a case-by-case basis that depends on architecture of the detection model 270 and/or corresponding machine learning library implementations. For instance, the vectorization layers 200 can be dynamic input shape layers that allow for variably sized inputs based on corresponding lengths for the inputs 250-257. Certain inputs can be truncated, padded with zero s/empty string characters to reach a fixed input length, and otherwise separated and formatted in accordance with input layers. The JavaScript inputs 250 can be truncated to a specified number of characters within corresponding script elements in HTML code and concatenated using newline characters. Text inputs 251 can comprise text content encapsulated in HTML elements separated by new line characters. URLs in the URL inputs 255 can be concatenated by intermediate white space characters. Certain machine learning libraries can have functionality at the vectorization layers 200 that allows for variable length inputs. In other embodiments, padding and/or compression can be used to lengthen and compress inputs into a standardized or acceptable length. Compression can occur at an additional layer and internal parameters for compression can be trained as part of overall training across layers of the detection model 270.

Each of the inputs 250-257 is generated from logs (capture logs, network logs, etc.) of network traffic between the endpoint device and a firewall in a cloud (not depicted). In some embodiments, the parser 240 is running inline on a network router managing ingress and egress traffic between the firewall and the endpoint device. Blocks 122, 126, 206, 204, 124, and 128 are depicted with solid outlines to denote that the parser 240 is capable of generating corresponding inputs 250, 251, 253, 252, 255, and 257, respectively, in an inline configuration. Thus, the blocks 122, 126, 206, 204, 124, and 128 are all capable of being included in architecture for the detection model 270 in an inline configuration. Conversely, blocks 208 and 210 are depicted with dotted outline to indicate that the corresponding inputs 254 and 256 are generated in an offline configuration from network logs and/or capture logs generated offline from HTTP responses to the Web crawler 2950. The parser 240 generates the inputs 254 and 256 according to a cloud configuration. These inputs 254, 256 incorporate additional data that is extracted by an inline parsing configuration from capture logs of an HTTP response. For instance, the redirects input 254 uses network logs at a router managing traffic between an endpoint device and a firewall. The parser 240 identifies a chain of redirect URLs across HTTP responses recorded at the network logs (for instance, URLs/IP addresses recorded in packets of egress traffic having a source IP address field in packet headers corresponding to the endpoint device). For the resource inputs 256, the parser 240 can query a database with URLs/IP addresses/other destination metadata in HTTP responses and HTTP GET requests to and from the endpoint device. The database can then return corresponding URIs for any identified resources.

Each of the blocks 122, 126, 206, 204, 208, 124, 210, and 128 comprises CNN layers including at least one convolutional layer(s), (optional) pooling layer(s), and flattening layer(s). The size and number of layers can depend on desired complexity of the detection model 270 and sizes of inputs. Outputs of the blocks 122, 126, 206, 204, 208, 124, 210, and 128 are concatenated at a dense block 202 that comprises dense layers, dropout layers, and a classification layer that outputs a phishing probability 260 comprising a probability value that phishing is indicated in at least one of the inputs 250-257.

Model architecture for the detection models 120, 270, and any other detection models depicted herein depends on various operational considerations. For instance, when using inline inputs such as the detection model 120, a more light-weight architecture with fewer internal layers and internal parameters can be implemented for faster classifications. This allows the entire machine learning pipeline from the packet analyzer 110 to the parser 112 to the detection model 120 to operate efficiently inline and phishing attacks such as zero-day exploits can be quickly detected and stopped. Conversely, a more complex (i.e., more internal layers and internal parameters) architecture such as that for the detection model 270 using additional inputs such as inputs generated from network logs can be used for detecting more advanced malicious actors. This more complex architecture gives higher accuracy classification as phishing attacks become more unpredictable and sophisticated. Other operational considerations include availability of training and testing data which can limit model complexity and available computing resources for phishing detection.

Figure 3:
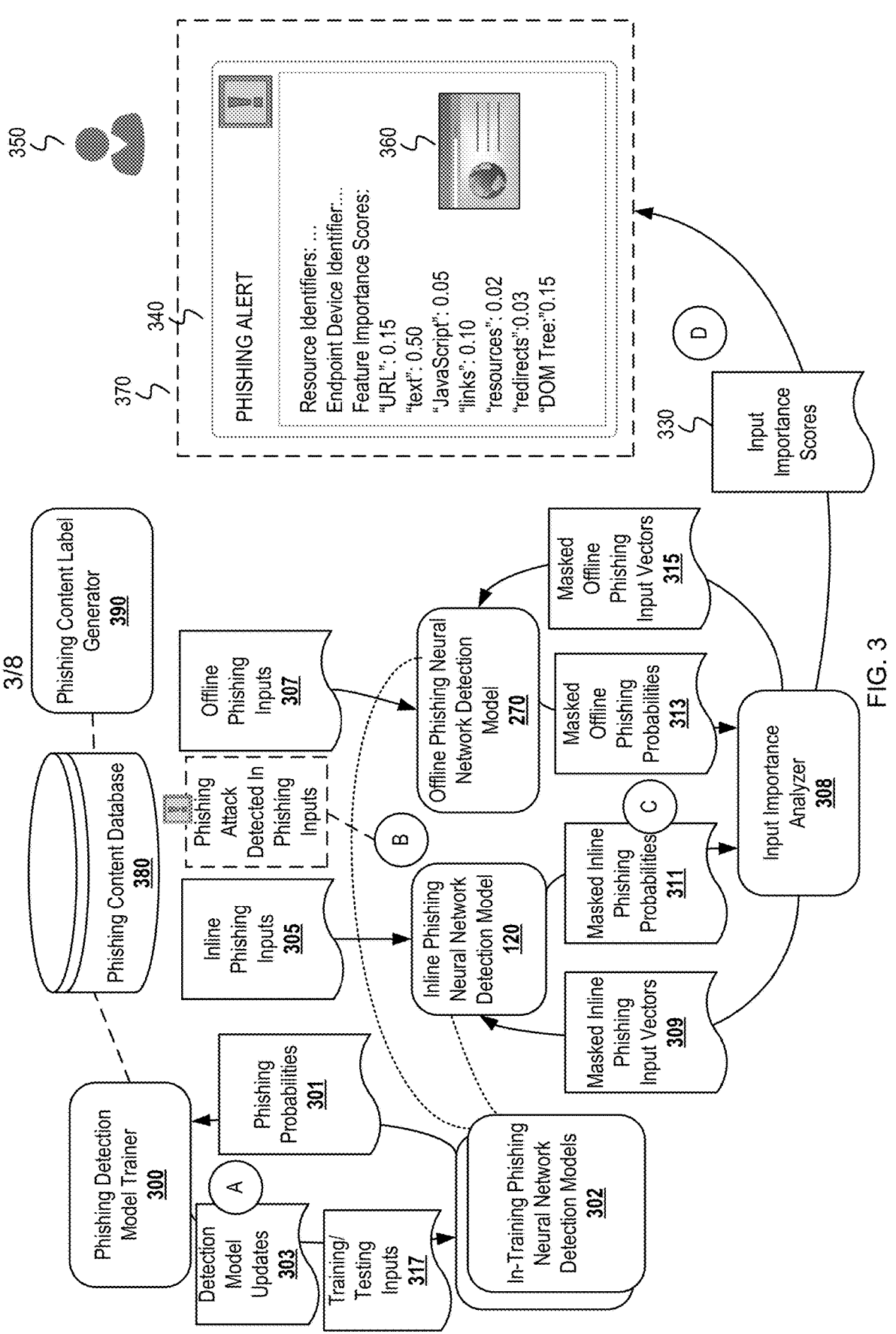
FIG. 3 is a schematic diagram of an example system for training and deployment of phishing neural network detection models and generating input importance scores for detected phishing attacks.

FIG. 3 is a schematic diagram of an example system for training and deployment of phishing neural network detection models and generating input importance scores for detected phishing attacks. FIG. 3 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

A phishing detection model trainer 300 uses training and testing data from a phishing content database 380 to train and deploy in-training phishing neural network detection models 302, including (once trained) the inline phishing neural network detection model 120 ("detection model 120") and the offline neural network detection model 270 ("detection model 270"). Upon detecting a phishing attack at one of the detection models 120, 270, an input importance analyzer 308 uses masked input vectors to generate input importance scores 330 that indicate importance of specific inputs for phishing classifications. These input importance scores 330 are included in phishing alerts presented to a user 350.

At stage A, based on determining that a phishing neural network detection model is to be trained, the phishing detection model trainer 300 queries the phishing content database 380 for training and testing data. The training and testing data comprises packets of network traffic communicated between endpoint devices and firewalls that are labelled as phishing or benign. The determination to train a phishing neural network detection model can be based on an amount of additional training and testing data collected at the phishing content database 380 over a previous time period since training last occurred, a number of new endpoint devices communicating with firewalls in a cloud, determination of improved neural network architectures for phishing detection, according to a periodic retraining cycle (e.g., every day, week), etc.

Labels (e.g., "phishing", "benign") for data in the phishing content database 380 are generated by a phishing content label generator 390. The phishing content label generator 390 sends content (e.g., capture files of network traffic) to multiple trained phishing detection models (not depicted) that may or may not have a neural network architecture. Content with consensus classifications by the multiple trained phishing detection models is added to training/testing data along with corresponding classifications as labels. Additionally, domain-level experts can periodically subsample the training and testing data stored in the phishing content database 380 to verify that labels are correct and, based on a determination that labels for certain samples are incorrect, can remove and/or apply additional detection models to corresponding segments of training data. A "segment" of training data refers to training data collected within a similar context as the incorrectly labelled training data such as a same time interval (e.g., day, hour, etc.), a same set of endpoint devices, a same set of firewalls, a same type of phishing attack, etc.

The phishing detection model trainer 300 initializes in-training phishing neural network detection models 302 ("in-training models 302"). Initialization comprises assigning initial weight values at internal layers of the in-training models 302. These initial values can depend on the type, size, and arrangement of the internal layers and can be according to standard initial weights for a machine learning library such as a PyTorch® library, a TensorFlow® library, etc. The phishing detection model trainer 300 additionally generates training/testing inputs 317 from the training/testing data received from the phishing content database 380. The content and format of the training/testing inputs 317 is according to model architecture for the in-training models 302. For instance, inputs in the training/testing inputs 317 can be strings corresponding to distinct elements of HTTP responses such as URLs, programming code, HTML elements, text content, etc. The number of training/testing inputs 317 can be based on an amount of available data in the phishing content database 380, and the training/testing data split can be determined uniformly at random from the available data. The ratio of training data to testing data and ratio of phishing labelled data to benign labelled data can be based on model architecture (e.g., number of internal parameters) as well as the amount of available data.

The in-training models 302 receive training inputs in the training/testing inputs 317 in batches, communicates resulting classifications as phishing probabilities 301 and, based on a loss function over each batch, the phishing detection model trainer 300 communicates detection model updates 303 for internal weights of the in-training models 302. The detection model updates 303 are computed by applying corresponding loss functions for the in-training models 302 to differences between classification probability values in the phishing probabilities 301 and 0/1 classification labels for corresponding training inputs (as communicated to the phishing detection model trainer 300 by the phishing model content database 380). Training occurs over a number of epochs (i.e., iterations through all batches of training data) and after the number of epochs, the in-training models 302 are tested for training and generalization error against the training/testing inputs 317. Once a desired training and generalization error are achieved or a threshold number of epochs has occurred, the phishing detection model trainer 300 either reevaluates model architecture and training/testing data due to high training/generalization error or deploys the in-training models 302.

At stage B, the detection models 120, 270 receive inline phishing inputs 305 and offline phishing inputs 307, respectively. The inline phishing inputs 305 and offline phishing inputs 307 are generated from network traffic between an endpoint device and a firewall according to the respective model architectures of the detection models 120, 270 (i.e., the inline phishing inputs 305 are generated from capture logs observed in real-time network traffic whereas offline phishing inputs 307 are additionally generated by crawling URLs offline and parsing the HTTP responses). For instance, the inline phishing inputs 305 can include a JavaScript input, a URL input, a text input, and a DOM model input. The offline phishing inputs 307 can include the inline phish inputs 305 as well as a resource input, a redirect input, and HTTP header input, a link input, etc. The detection models 120, 270 both determine that a phishing attack is indicated in the inline phishing inputs 305 and offline phishing inputs 307, respectively (e.g., by determining that classification probability values for phishing output by the detection models 120, 270 are above 0.5). In some embodiments, prior to subsequent operations that use masked input vectors to generate input importance scores 330, the detection models 120, 270 or a separate component such as a firewall monitoring security for endpoint devices can generate an alert that a phishing attack was detected and block ingress and egress traffic to any URLs/URIs indicated in the phishing attack.

At stage C, a input importance analyzer 308 uses masked input vectors to the detection models 120, 270 to generate input importance scores 330. The input importance analyzer 308 generates masked inline phishing input vectors 309 and masked offline phishing inputs 315 to input to the detection models 120, 270, respectively. Each of the masked phishing inputs 309, 315 comprises a number of masked input vectors equal to the number of inputs in each input vector to the respective models. Here, the term "input vector" is used to refer to a vector inputs that comprises inputs across internal blocks of the detection models 120, 270, and the term "input" is used to refer to sections of the input vector that correspond to characteristics of content (i.e., that feed into separate blocks in the detection models 120, 270). Each masked input vector is generated from the phishing inputs 305, 307 by replacing values for a specific input with zeroes. In embodiments where the inputs are vectors of strings, the input is replaced with an empty string in the masked input vectors (or, for other data structures, a corresponding empty or nil set of values). The detection models 120, 270 classify each masked input vector in the masked phishing inputs 309, 315 to generate masked inline phishing probabilities 311 and masked offline phishing probabilities 313, respectively. The input importance analyzer 308 then uses the probabilities to generate the input importance scores 330.

For a set of n inputs with corresponding masked phishing probabilities $\{p_i\}_{i=1}^{n}$ and a phishing probability of p for the unmasked input vector, the input importance analyzer 308 uses the formula $$s_j = \frac{|p_j - p|}{\sum_{i=1}^{n}|p_i - p|}$$

to calculate the importance score for the jth input. To exemplify, suppose there are 3 inputs with corresponding masked probabilities 0.7, 0.8, and 0.9, and that the deployed model generated a probability of 0.9 for the unmasked input vector. Then, the first input will have a input importance score of $$s_1 = \frac{|0.7 - 0.9|}{|0.7 - 0.9| + |0.8 - 0.9| + |0.9 - 0.9|} = \frac{2}{3}.$$

The other input importance scores are $$s_2 = \frac{1}{3}$$

and $s_3=0$. Intuitively it makes sense for the first input to have the highest importance score because the probability of phishing lowered the most when masking this input, meaning that this input effectively had the greatest impact on phishing classification. Conversely, masking the third input had no impact on the phishing probability resulting in a input importance score of zero. Other formulae for generating input importance scores can be implemented (for instance, by taking $|p_i-p|^{\alpha}$ for some exponent a in the above formula).

At stage D, the input importance scores 330 are added to a phishing alert such as example phishing alert 340 that is presented to the user 350 via a graphical user interface (GUI) 370. The user 350 can be a user at an endpoint device targeted by phishing, a network administrator managing firewalls that monitor endpoint devices, etc. The example phishing alert 340 comprises the following fields:

Resource Identifiers: . . .

Endpoint Device Identifier: . . .

Input Importance Scores:

"URL": 0.15

"text": 0.50

"JavaScript": 0.05

"links": 0.10

"resources": 0.02

"redirects": 0.03

"DOM tree": 0.15

Note that the input importance scores sum to 1 (this is consistent with the above formula where they are normalized to sum to 1). The importance scores indicate that the text input was most important for phishing detection. This importance score can be used to inform future model architecture (e.g., by giving a higher weighting to outputs of a text block at a dense block). The example phishing alert 340 additionally includes a browser rendering 360. The browser rendering 360 is generated by rendering HTTP responses corresponding to the detected phishing attacks in a web browser and displaying the image of the browser rendering in the GUI 370. Generating the rendered browser 360 can help the user 350 determine the cause and/or type of phishing attack (e.g., webmail phishing, trusted site impersonation, link manipulation, grayware/scareware, etc.). In instances where phishing involves redirects, multiple browser renderings corresponding to each redirect can be generated in a phishing alert.

FIGS. 4-7 are flowcharts of example operations for phishing detection model training and deployment, for input importance determination, and for operations for inputting inputs into various detection models. The example operations in FIGS. 4-7 are described with reference to a packet analyzer, a phishing input parser (hereafter "parser"), a phishing content label generator, a input importance analyzer, neural network detection models (hereafter "detection models") including an inline phishing neural network detection model (hereafter "inline model") and an offline phishing neural network detection model (hereafter "offline model"), a Web crawler, and a detection model trainer for consistency with the earlier Figure(s). The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 4:
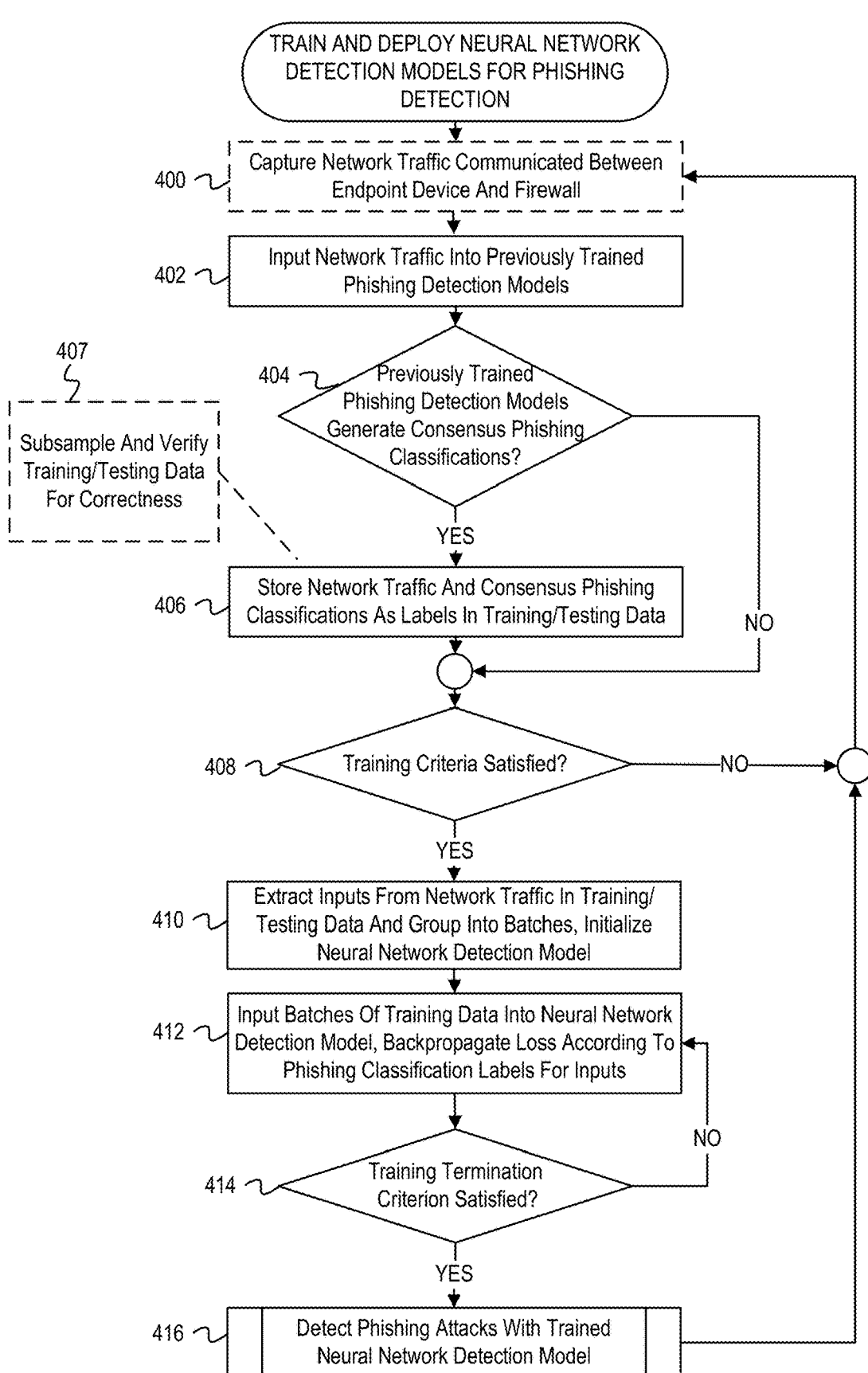
FIG. 4 is a flowchart of example operations for training and deploying neural network detection models for phishing detection.

FIG. 4 is a flowchart of example operations for training and deploying neural network detection models for phishing detection. At block 400, a packet analyzer captures network traffic communicated between an endpoint device and a firewall. The packet analyzer can capture network traffic as PCAP or PCAPNG files. Block 400 is depicted with a dashed outline to indicate that the capture and storage of network traffic occurs continuously and in parallel with the remainder of the operations in FIG. 4 until an external trigger stops the process and the operations in FIG. 4 terminate (e.g., an endpoint device disconnects from a firewall, a database storing network traffic runs out of storage, etc.).

At block 402, a phishing content label generator inputs the captured network traffic into previously trained phishing detection models. In some embodiments, for computational/storage efficiency, only a subset of captured network traffic is input into the previously trained phishing detection models. For instance, captured network traffic can be input according to a schedule (e.g., every hour), based on available storage for a repository that stores training/testing data for phishing detection models, etc. The previously trained phishing detection models comprise any models trained to detect phishing including models without a neural network architecture. For instance, the previously trained phishing detection models can be models that use handcrafted inputs to detect specific types of phishing. A handcrafted input can be a comparison of URLs with a database of popular trusted URLs using a determination that the URL is distinct but close enough in Levenshtein distance to a trusted URL to indicate an impersonation phishing attack.

At block 404, the phishing content label generator determines whether the previously trained phishing detection models generated a consensus phishing classification. In some embodiments, the determination is that a threshold fraction (e.g., $\%_{10}$) of the previously trained phishing detection models generated a same phishing classification. Other criteria, such as that specific subsets of the phishing detection models generated same phishing classifications, can be used. If the phishing detection models generated a consensus phishing classification, flow proceeds to block 406. Otherwise, flow proceeds to block 408.

At block 406, the phishing content label generator stores the network traffic and consensus phishing classifications as labels in training/testing data. The training/testing data is used to train and retrain phishing detection models including the phishing neural network detection models disclosed herein. The network traffic can be stored as PCAP or PCAPNG files in a repository comprising data for firewalls monitoring endpoint devices communicating the network traffic. Network traffic can be selectively stored based on available storage space in the repository, amount of phishing labelled vs benign labelled data (i.e., to maintain a desired ratio of phishing to benign labelled data), etc.

At supplemental block 407, training/testing data that was labelled and stored at block 406 is subsampled and verified for correctness. Block 407 is depicted with a dashed outline and separated from the overall flow of FIG. 4 because this block occurs separately from the depicted flow of operations and according to a schedule by which domain-level experts are available to check training/testing data for correctness. Domain-level experts subsample training/testing data uniformly at random so as to not bias towards specific segments of data and to catch incorrectly labelled data uniformly across the data set. Training/testing data is verified by analyzing corresponding PCAP/PCAPNG files, rendering HTTP responses in a browser, etc. The domain-level experts have expertise to detect multiple types of phishing and also to determine when false negatives and false positives occur. The volume of subsampling is according to available domain-level experts and corresponding efficiency in verifying correctness. Upon determining that a label is incorrect, a corresponding segment of the training/testing data can be reevaluated by the phishing detection models and, in some embodiments, removed from the training/testing data for unreliable labelling.

At block 408, a detection model trainer determines whether a training criterion is satisfied. The training criterion can be that an amount of additional training/testing data has been captured/stored, can be according to a fixed schedule for training and retraining of detection models, can be based on design of an improved network architecture for detection models, etc. If the training criterion is satisfied, flow proceeds to block 410. Otherwise, flow proceeds to block 400.

At block 410, a parser extracts inputs from network traffic in the training/testing data and the detection model trainer groups the inputs into batches and initializes a neural network detection model ("detection model"). The parser extracts inputs based on formats of inputs to the detection model. For instance, the parser can extract strings from PCAP/PCAPNG files corresponding to text inputs, DOM tree inputs, JavaScript® inputs, URL inputs, etc. according to a standardized format of the PCAP/PCAPNG files as well as syntax for a markup language and other programming languages indicated in the PCAP/PCAPNG files. Batch size is determined based on the amount of training/testing data and complexity (number of internal parameters) of the detection model (i.e., more complex detection models have larger batch sizes and more training/testing data). The detection model is initialized by setting initial weights at internal layers of the detection model according to layer types/sizes and a corresponding machine learning library used to implement the detection model.

At block 412, the detection model trainer inputs batches of training data into the detection model and backpropagates loss according to phishing classification labels for the inputs. The loss is computed across each batch based on a difference between probability values outputs by the detection model and corresponding 0/1 labels (i.e., 0 labels being benign, 1 labels being phishing). For instance, a binary cross entropy loss function can be used. Backpropagation treats the entire neural network as a composite function (including the loss function, input layers, internal layers, etc.) and performs gradient descent on the internal weights with a reverse chain rule methodology on the composite function. The batches of training data can be input to the detection model by the detection model trainer and used for backpropagation across several epochs (i.e., iterations through the entire training data set in batches).

At block 414, the detection model trainer determines whether training criteria are satisfied. The training criteria can be that training error and generalization error are below corresponding thresholds, that training and testing error stabilize across training iterations, that a threshold number of epochs has occurred, etc. In some embodiments, the testing data is split into testing and validation data, where validation data is used to evaluate and tune model hyperparameters across smaller sets of batches, and testing data is used to compute generalization error after several epochs. If the training criteria are satisfied, flow proceeds to block 416. Otherwise, flow proceeds to block 412.

At block 416, phishing attacks are detected with the trained neural network detection model. The operations at block 416 are described in greater detail with reference to FIG. 5. Flow proceeds to block 400.

Figure 5:
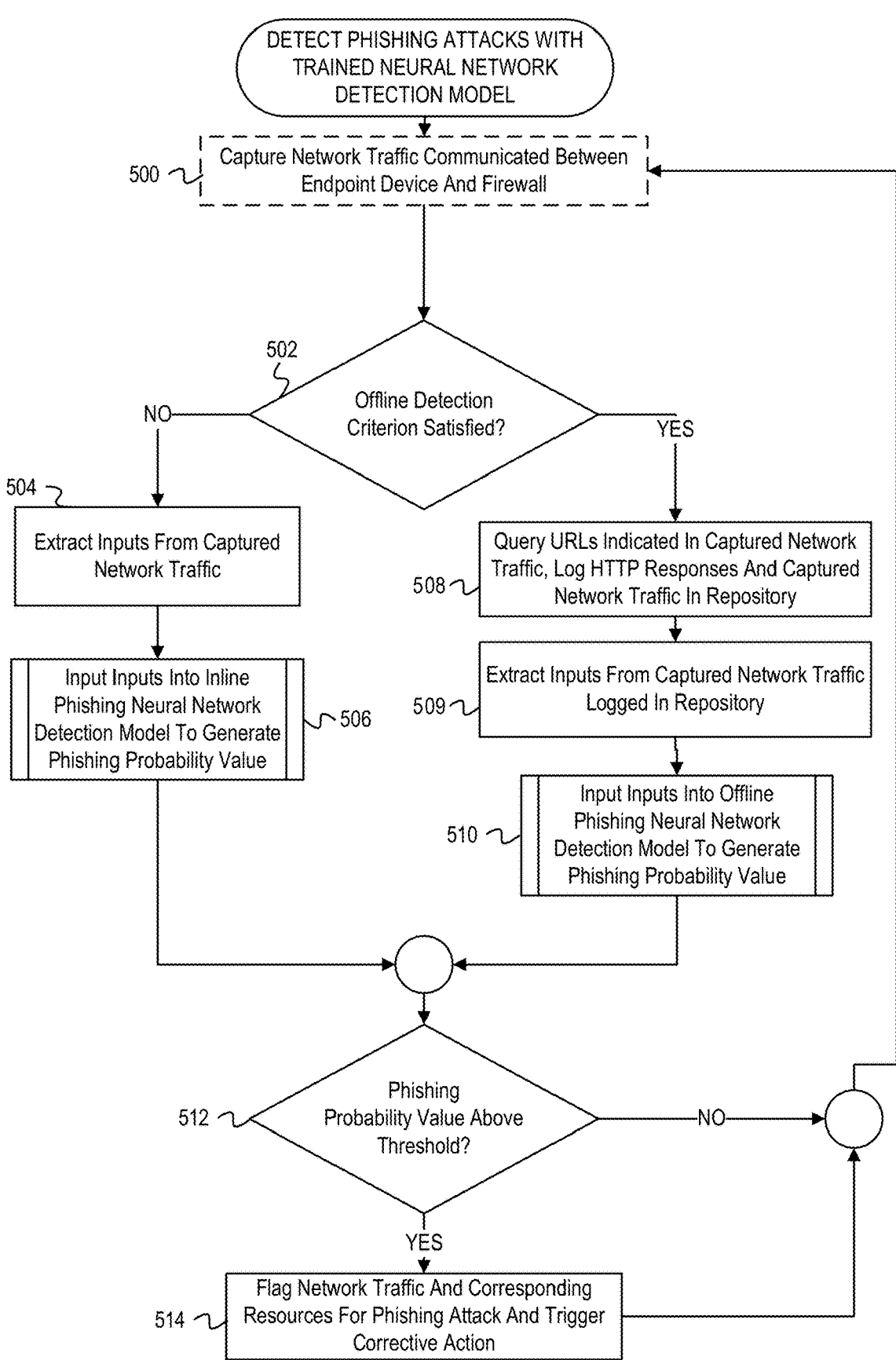
FIG. 5 is a flowchart of example operations for detecting phishing attacks with trained neural network detection models ("detection models").

FIG. 5 is a flowchart of example operations for detecting phishing attacks with a trained neural network detection model ("detection model"). At block 500, a packet analyzer captures network traffic communicated between an endpoint device and firewall. The packet analyzer can capture network traffic as PCAP/PCAPNG files that it stores in local memory while phishing detection occurs. The packet analyzer operates inline when capturing network traffic. The remaining operations in FIG. 5 may or may not occur inline based on a corresponding configuration and deployment of parsers and detection models. Distinct offline configurations allow for generation and analysis of additional inputs such as redirect inputs and resource inputs using network logs. Block 500 is depicted with a dashed outline to indicate that network traffic capture occurs continuously in parallel with the remaining operations in FIG. 5 until an external trigger (e.g., deletion of a user account associated with the endpoint device) occurs resulting in termination of operations. Capture logs of network traffic can be used for additional malware analysis outside of phishing detection as part of firewall operations, and this analysis can also occur at least partly inline.

At block 502, the parser determines whether an offline detection criterion is satisfied. The offline detection criterion can be whether an inline model or offline model is deployed for phishing detection, or can be a criterion to evaluate which model to use involving factors such as available computational resources, security risk levels at the endpoint devices, etc. If the offline detection criterion is satisfied, flow proceeds to block 508. Otherwise, flow proceeds to block 504. In some embodiments, the operations at block 502 are omitted and flow proceeds directly to one of blocks 504 and 508 based on whether an inline model or an offline model is deployed.

At block 504, a parser extracts inputs from the captured network traffic. The extracted inputs are parsed according to network architecture for corresponding detection models. For instance, the parser can extract URL inputs, DOM tree inputs, link inputs, text inputs, and JavaScript® inputs for an inline phishing neural network detection model ("inline model"). Format (e.g., data type and structure) of the inputs is additionally determined by network architecture at the input layers. In an embodiment, the inline model is "end-to-end" in the sense that the inputs are raw strings extracted from relevant sections of PCAP/PCAPNG files and the outputs are phishing probability values. In some embodiments, the captured network traffic is sorted per endpoint device (e.g., according to a private source IP address indicated in packet headers) and phishing probability values are generated per endpoint devices using separate invocations of detection models. In other embodiments, phishing probability values vary in granularity such as per endpoint device session, across multiple endpoint devices, across time intervals, etc. For the inline configuration, the inputs are such that the parser extracts the inputs in one pass of the PCAP/PCANG files and classification occurs immediately with minimal latency (including, in some embodiments, implementation of the inline model on a same component as the parser and the packet analyzer).

At block 506, the parser inputs the inputs into the inline model to generate a phishing probability value. The inline model can be chosen to have lightweight (i.e., less input layers/smaller input layers, less inputs, less internal parameters) network architecture to speed up classifications. Operations for inputting inputs into the inline model are depicted in greater details in a flow of FIG. 7. Flow proceeds to block 512.

At block 508, a Web crawler queries URLs indicated in the captured network traffic and logs corresponding HTTP responses in a repository. The Web crawler queries URLs according to an internal selection policy. This internal selection policy can prioritize URLs indicated in the captured network traffic. The Web crawler can then iteratively crawl URLs indicated in the HTTP responses from the URLs. The Web crawler can crawl additional URLs such as URLs provided by third-party phishing vendors, and a repository of known phishing URLs can be maintained that allows the captured network traffic to be immediately flagged based on detected phishing URLs in the repository.

At block 509, the parser extracts inputs from the captured network traffic logged in the repository. The inputs are for an offline phishing neural network detection model ("offline model"), and the parser can generate the aforementioned inputs for an inline model as well as redirect inputs, resource inputs, HTTP header inputs, etc. Because the offline model is operating in an offline configuration, the parser can allow the Web crawler to crawl additional URLs before phishing detection occurs. The parser can extract inputs for phishing detection at intervals according to a schedule or when manually triggered by a user.

At block 510, the parser inputs the inputs into the offline model to generate a phishing probability value. The offline model can be deployed on a separate component from the packet analyzer and parser. Additionally, the parser can extract inputs (at block 502) from sources besides capture logs such as network logs at a network router that is routing traffic to endpoint devices corresponding to network traffic for the inputs and a database of network resources that are mapped out by the firewall(s) (multiple parsing components can be used at each corresponding device from which inputs are generated). These network logs can be used to generate additional inputs such as redirect inputs based on URL access for the endpoint devices (e.g., as indicated in packet headers for sessions/flows and DNS lookups), and resource inputs generated by associating Internet Protocol (IP) addresses/URLs/other metadata in the network logs with URIs. Resources and associated metadata can be maintained in a separate repository that is accessed when generating resource inputs. The offline model can have a higher complexity architecture to account for the increased number of inputs and can be trained on an additional amount of training/testing data. Operations for inputting inputs into the offline model to generate a phishing probability value are depicted in greater detail in a flow of FIG. 7. Flow proceeds to block 512.

At block 512, a corresponding one of the inline model and offline model generates a phishing probability value that is above a threshold. For instance, the threshold can be a probability value of 0.5. The threshold can be tuned during training to minimize training and generalization error and minimize false positives/negatives. If the phishing probability value is above the threshold, flow proceeds to block 514. Otherwise, flow proceeds to block 500.

At block 514, a corresponding one of the inline model and offline model flags the network traffic and corresponding resources for a phishing attack and triggers correction action. For the inline model, phishing attacks are flagged in real-time and corrective action occurs immediately, in some embodiments before a user is duped by the phishing attack. For both the offline and inline models, flagged URLs are added to the repository of flagged URLs for future detection of phishing attacks. Corrective action can comprise displaying an alert to a GUI of a domain-level expert for evaluation of type and severity of the phishing attack. The alert can comprise endpoint identifiers, URIs, input importance scores, rendered browser images, etc. that assist with this evaluation. Alerts can additionally be displayed to users affected by the phishing attack via GUIs at endpoint devices. Additional corrective actions can include throttling traffic to URLs/URIs corresponding to the phishing attack and escalating security levels associated with users, applications, endpoint devices, etc. associated with the phishing attack.

Figure 6:
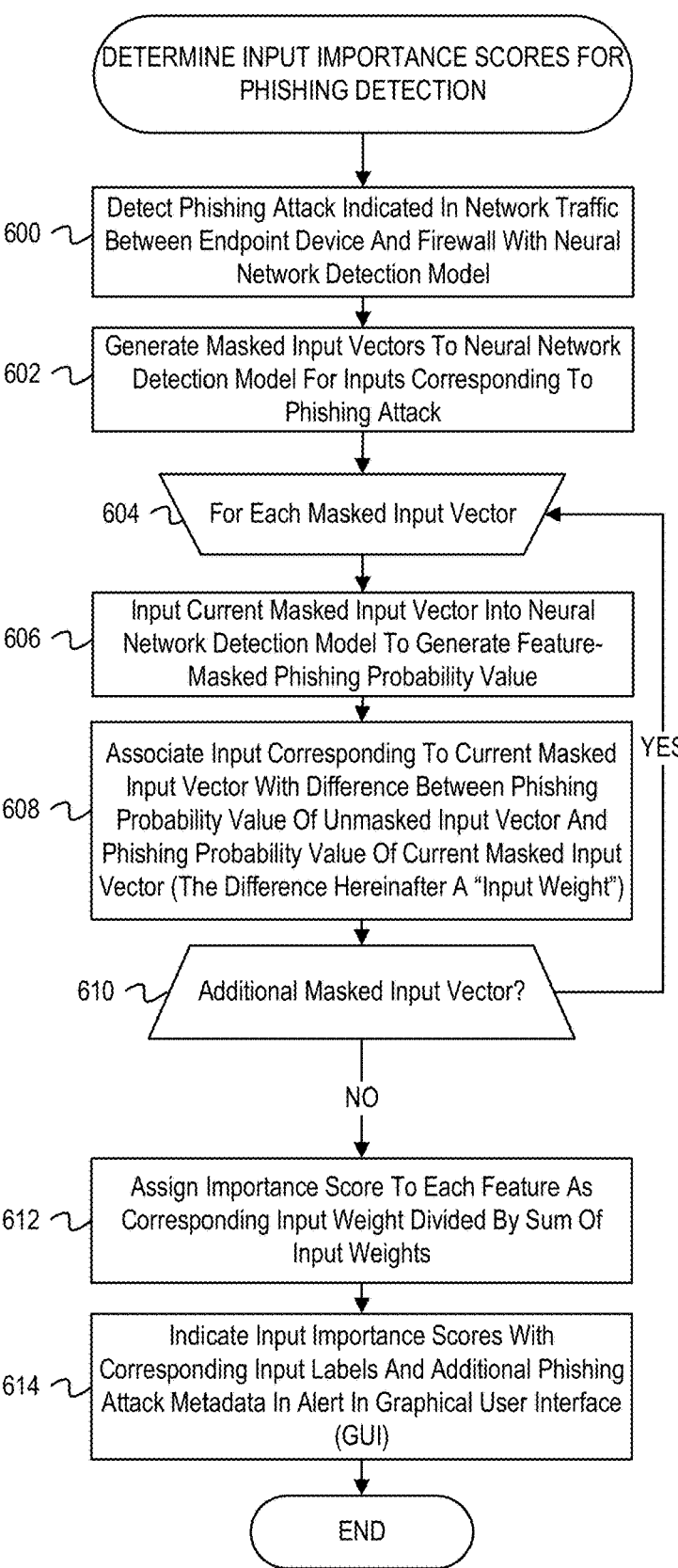
FIG. 6 is a flowchart of example operations for determining input importance scores for phishing detection.

FIG. 6 is a flowchart of example operations for determining input importance scores for phishing detection. At block 600, a neural network detection model ("detection model") detects a phishing attack indicated in network traffic between an endpoint device and a firewall. Additional components such as a packet analyzer and a parser can capture logs of network traffic and extract inputs from the captured logs as inputs to the detection model according to network architecture of the detection model. Detection of the phishing attack is based on a probability value output by the detection model being above a threshold probability value.

At block 602, a input importance analyzer generated masked input vectors to the detection model for inputs corresponding to the phishing attack. Each masked input vector corresponds to one of the inputs in an input vector comprising all inputs to the detection model and is generated by replacing the section of the input vector corresponding to the input with zeros. In some embodiments where the data type of the inputs is not numerical, the section of the input vector can be replaced with other data types. For instance, for string inputs this section can be replaced by a vector of blank strings.

At block 604, the input importance analyzer begins iterating through masked input vectors. The example operations at each iteration occur at blocks 606 and 608.

At block 606, the input importance analyzer inputs the current masked input vector into the detection model to generate a masked phishing probability value. The input-masked phishing probability value represents the probability that the detection model classifies inputs as corresponding to a phishing attack without relying on a current input corresponding to the current masked input vector. This allows the input importance analyzer to track input importance towards arriving at the phishing classification from the unmasked input vector At block 608, the input importance analyzer associates the current input corresponding to the current masked input vector with a difference between the phishing probability value of the unmasked input vector and the phishing probability value of the current masked input vector (the difference hereinafter the "input weight") This difference represents an impact the current input had on generating the phishing probability value of the unmasked input vector in the detection model by comparison with a corresponding probability value when the current input is not used.

At block 610, the input importance analyzer determines whether there is an additional masked input vector. If there is an additional masked input vector, flow proceeds to block 604. Otherwise, flow proceeds to block 612.

At block 612, the input importance analyzer associates an importance score to each input as a corresponding input weight divided by a sum over all input weights. This is computed according to the aforementioned formula for n inputs, $$s_j = \frac{w_j}{\sum_{i=1}^{n} w_i},$$

where $s_j$ is the importance score of the jth input, and $\{w_i\}_{i=1}^{n}$ are the input weights. Other formulae for importance scores can be used. For instance, the above formula can be solely the input weights without normalization. Any function $s_j=f(w_j)$ that is monotonically increasing for each input based on an input weight (e.g., if $a>b$, then $f(a)>f(b)$) can be used.

At block 614, the input importance analyzer indicates the input importance scores with corresponding input labels and additional phishing attack metadata in an alert in a GUI. The GUI can be presented to a user at an endpoint device exposed to phishing, to a network administrator monitoring user behavior at the endpoint device, to a domain-level expert analyzing the threat landscape of phishing attacks, etc. The GUI can contain additional metadata such as resource identifiers for resources being accessed by a user at the endpoint device where the phishing occurred, resource identifiers/URLs/IP addresses for any redirects that occurred during the phishing attack, associated user and/or endpoint device identifiers, application identifiers for applications associated with the phishing attack, rendered browsers that the user viewed during the phishing attack, etc. The input importance scores can be used by a domain-level expert designing detection models to improve model performance with respect to false negatives and positives by modifying network architecture around important inputs. These importance scores can be used by users to determine why a false positive occurred during phishing detection. Additionally, the input importance scores can be used to determine strong indicators for various types of correctly detected phishing attacks, and the importance of these inputs can also be used to modify/improve network architecture for phishing detection. To exemplify, blocks of network architecture for important inputs can be increased in complexity, can be given increased weights/more entries in dense layers, blocks of network architecture of less important blocks can be decreased in complexity, can be removed, etc.

Figure 7:
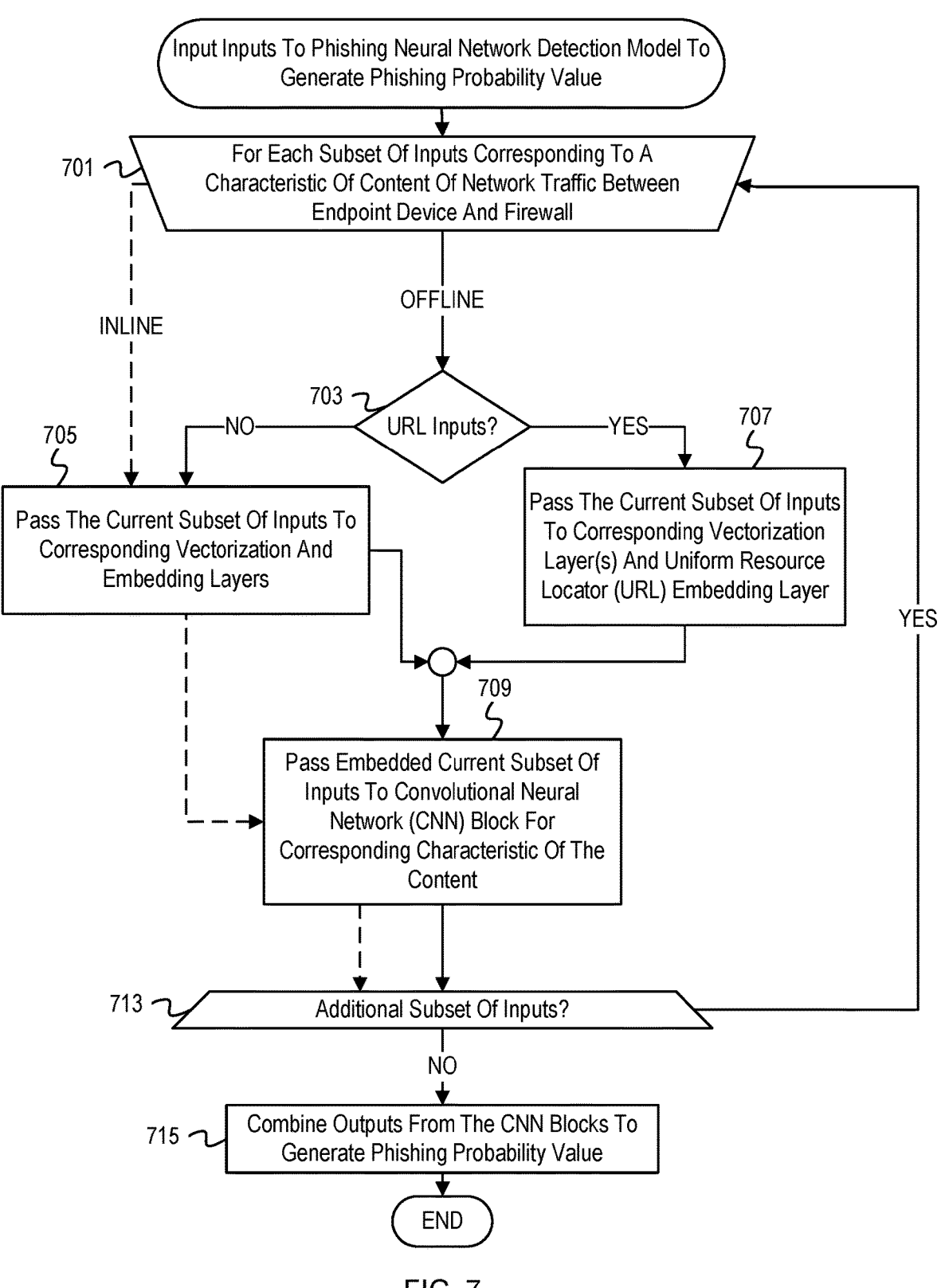
FIG. 7 is a flowchart of example operations for inputting inputs into a phishing neural network detection model to generate a phishing probability value.

FIG. 7 is a flowchart of example operations for inputting inputs into a phishing neural network detection model to generate a phishing probability value. At block 701, a phishing neural network detection model ("detection model") begins iterating through subsets of inputs corresponding to a characteristics of network traffic between an endpoint device and a firewall. For instance, the subsets of inputs can be text extracted from an HTTP response sent to the endpoint device being analyzed by the firewall based on a query by the endpoint device to a URL on the Internet. The subsets of inputs at each iteration are determined by the detection model according to indices in an input vector comprising the inputs of network traffic. Each subset of inputs is delineated by a fixed upper and lower index in the input vector that the detection model uses to pass the subset of inputs to further layers. In some embodiments, subsets of inputs can have a dynamic size across inputs to the detection model (e.g., when input layers are dynamic layers), the subsets of inputs can comprise values delineating the size of each subset of inputs, and the detection model uses the values to determine upper and lower indices of the subsets of inputs. The example operations at each iteration occur at blocks 703, 705, 707, and 709. Flow for each iteration when the detection model is an inline model is depicted with a dashed line, while flow for each iteration when the detection model is an offline model is depicted with a solid line. Flow for the inline model proceeds to block 705 and then block 709. Conversely, flow for the offline model proceeds depending on a determination at block 703. While depicted as a separate flow for the inline model, in some embodiments the inline model includes multiple URL inputs and the flow in FIG. 7 is the same (i.e., the solid line) for both the offline and inline models.

At block 703, the detection model determines whether the current subset of inputs comprise URL inputs. The determination can be based on corresponding upper and lower indices in the input vector that determine where the subsets of inputs get passed to in the detection model. In other embodiments, the determination is based on a number and/or identifier (e.g., third subset of inputs, a "URL" metadata tag) of the current subset of inputs. If the current subset of inputs comprises multiple URL inputs, flow proceeds to block 705. Otherwise, flow proceeds to block 707.

At block 705, the detection model passes the current subset of inputs to corresponding vectorization and embedding layers. The vectorization layer(s) maps text inputs in the current subset of inputs to a numerical vector. The numerical vector can be generated according to an index/dictionary that assigns numbers to string tokens. Additional preprocessing steps can be performed at the vectorization layer(s) such as punctuation stripping, removing case, splitting into substrings, recombining substrings into n-gram tokens, associating each token with a number according to the index/dictionary, and then converting the numbers into the numerical vector. The embedding layer(s) can convert each number in the numerical vector output by the vectorization layer(s) into vectors of a fixed size (specified as a hyperparameter when configuring the detection model prior to training) according to an embedding learned during training. In other embodiments, the vectorization and embedding layers are combined such as when using the word2vec algorithm. Flow proceeds to block 709

At block 707, the detection model passes the current subset of inputs to corresponding vectorization layer(s) and a URL embedding layer. The URL embedding layer is shared across all subsets of inputs that correspond to URL inputs (e.g., redirect inputs, links inputs, URL inputs, resource inputs, etc.). This is so that during training, the detection model learns a same embedding for any URL inputs which improves overall quality of the embedding due to increased training data and more diverse training data. Flow proceeds to block 709.

At block 709, the detection model passes the embedded current subset of inputs to a CNN block for a corresponding characteristic of the content. The embedded current subset of inputs comprises outputs from a corresponding embedding layer for the current subset of inputs. "Characteristic" refers to an aspect of the content captured by the corresponding subset of inputs. For instance, a redirects inputs captures redirection characteristics by a potentially malicious attacker sending an HTTP response. A JavaScript input captures functionality/syntax characteristics of JavaScript code that executes in the HTTP response. HTTP header fields inputs capture header fields that can indicate profile characteristics typical of malicious phishing attacks. Each block is trained to detect the corresponding characteristic when it occurs.

At lock 713, the detection model determines if there is an additional subset of inputs. If there is an additional subset of inputs, flow proceeds to block 701. Otherwise, flow proceeds to block 715.

At block 715, the detection model combines outputs from the CNN blocks to generate a phishing probability value. The detection model can concatenate the outputs from the CNN blocks at a concatenation input layer. The detection model can then pass the concatenated outputs to dropout layers and dense layers. A final dense layer can combine inputs into a single output comprising the phishing probability value. The dense layers can have an activation function (e.g., a Rectified Linear Unit) and, in some embodiments, a regularization function for a kernel weight matrix applied to the inputs (prior to the activation function) and a bias vector for the kernel weights matrix. The dropout layer can randomly zero out units of input according to a configurable probability value.

While described as passing between layers/blocks, the abstraction of passing is used to illustrate flow of inputs and outputs within the detection model. The detection model when executed in code applies code units according to each layer directly to outputs at the previous layer (or, in the instance of the first layer, the input vector to the detection model). Each layer is a code unit with functionality that takes inputs according to this illustrated flow as arguments and generates outputs that are then sent to other code units (layers). The flow between layers and blocks as well as hyperparameters for each layer/block can be generated and tuned using an application programming interface (API) for a machine learning library or can be coded directly in an implementation of the detection model.

Variations

Various inputs that are input to neural networks are described herein with reference to HTML as a markup language. Any appropriate markup language such as members of the family of Extensible Markup Languages (XML) can be used. Moreover, inputs can be extracted from any corresponding programming languages indicated in user-presented content and protocols thereof during phishing attacks. Other communications protocols besides HTTP (e.g., HTTPS) for querying and responding to queries of URLs are anticipated. Network traffic can be intercepted and analyzed for phishing attacks at firewalls, at endpoint devices, and at any other component monitoring and analyzing network traffic for malicious activity and logged in corresponding repositories that are accessed by packet analyzers, parsers, and detection models.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 406 and 407 can be performed in parallel or concurrently. With respect to FIG. 4, subsampling and verifying training/testing data for correctness is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 8:
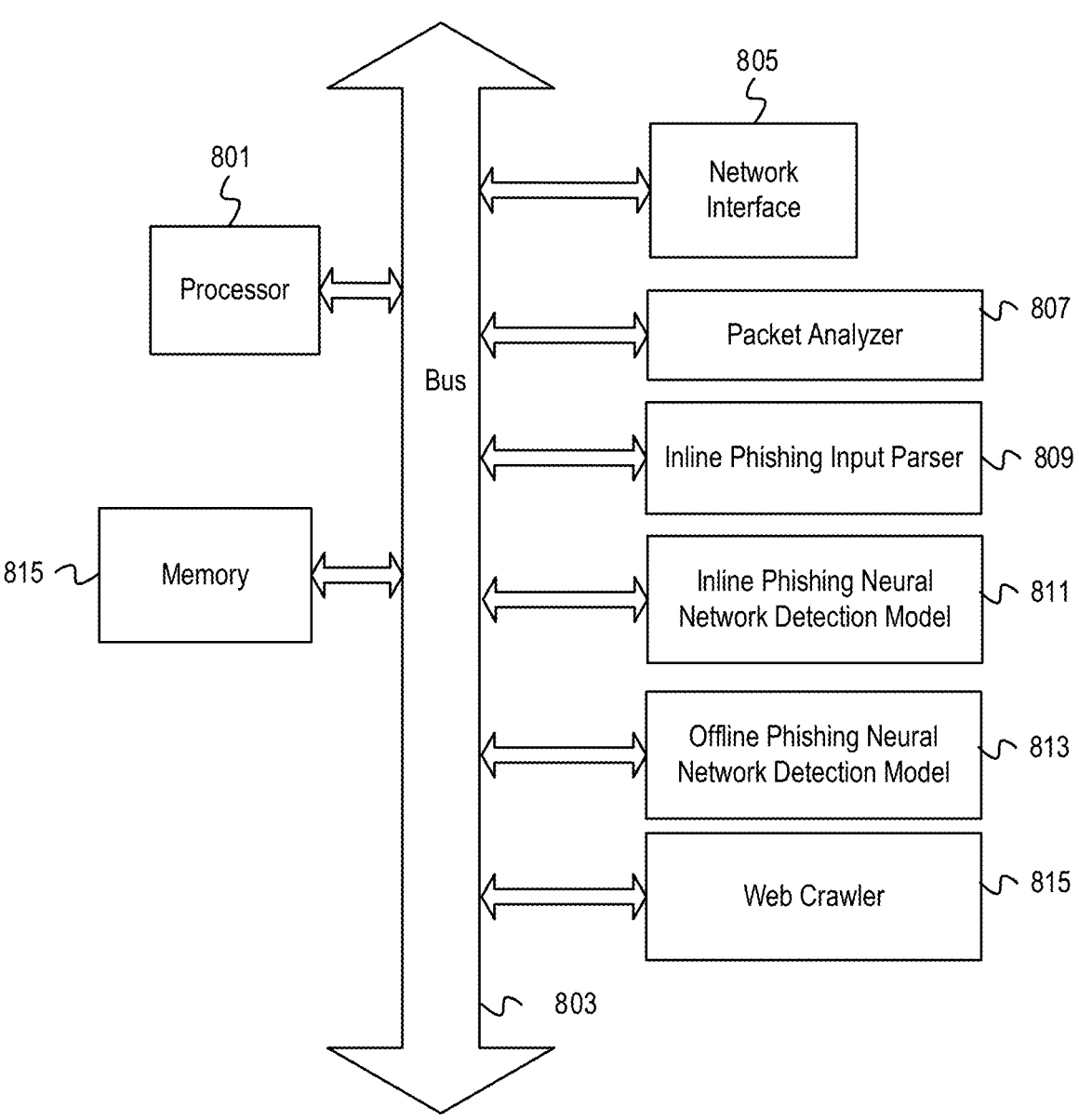
FIG. 8 depicts an example computer system with a packet analyzer, an inline phishing input parser, an inline phishing neural network detection model, an offline phishing neural network detection model, and a Web crawler.

FIG. 8 depicts an example computer system with a packet analyzer, an inline phishing input parser, an inline phishing neural network detection model, an offline phishing neural network detection model, and a Web crawler. The computer system includes a processor 801 (possibly including multiple processors, multiple cores, multiple nodes, and/or implementing multi-threading, etc.). The computer system includes memory 815. The memory 815 may be system memory or any one or more of the above already described possible realizations of machine-readable media. The computer system also includes a bus 803 and a network interface 805. The system also includes a packet analyzer 807, an inline phishing input parser 809, an inline phishing neural network detection model 811 ("inline model 811"), an offline phishing neural network detection model 813 ("offline model 813"), and a Web crawler 815. The packet analyzer 807 extracts capture logs inline from network traffic between an endpoint device(s) and a firewall(s). The inline phishing input parser 809 extracts inline inputs such as JavaScript® inputs, text inputs, HTTP header inputs, DOM tree inputs, URL inputs, etc. The inline phishing input parser 809 is configured to extract inputs inline at one pass through packets as the packet analyzer 807 records corresponding capture logs. In some embodiments, the packet analyzer 807 and inline phishing input parser 809 are running on a same inline component and the inline phishing input parser 809 and can receive a stream of packet data from the packet analyzer 807 simultaneous/as part of the pipeline for logging of the packet data in capture logs. Both the inline model 811 and the offline model 813 can receive inputs generated by the inline phishing input parser 809. The inline model 811 is configured to operate inline with the inline phishing input parser 809 and the packet analyzer 807. Conversely, the offline model 813 can use additional inputs such redirect inputs, resource inputs, etc. extracted from network logs and HTTP responses to additional URLs queried by the Web crawler 815 not available at the packet analyzer 807. Both models 811, 813 make phishing classifications that can prompt corrective action and alerts to GUIs, as well as generation of input importance scores to identify inputs correlated to phishing classifications as well as false negatives/positives. While depicted as components of a same example computer system, the components 807, 809, 811, 813, and 815 can be running on distinct computing devices. Any one of the previously described functionalities may be partially (or entirely) implemented in hardware and/or on the processor 801. This functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 815 may be coupled to the processor 801.

While the aspects of the disclosure are described with reference to various implementations and exploitations, it will be understood that these aspects are illustrative and that the scope of the claims is not limited to them. In general, techniques for inline and offline phishing detection using holistic machine-learning models and input importance identification via input importance scores for inputs to the models that correspond to phishing classification and/or false negatives/positives as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The invention claimed is:

1. A method comprising:

inline parsing capture logs of network traffic between a first endpoint device and a first firewall to extract inputs corresponding to characteristics of first content returned responsive to a query to a first Uniform Resource Locator (URL) by the first endpoint device as indicated in the capture logs;

inputting the inputs into a first neural network comprising a plurality of neural network blocks arranged in parallel, wherein different subsets of the inputs correspond to different characteristics of the first content and each neural network block corresponds to a different one of the characteristics;

processing the inputs with the plurality of neural network blocks, wherein processing the inputs comprises each neural network block processing the one of the subsets of the inputs corresponding to a same one of the characteristics as the neural network block;

outputting a first probability value that the first content indicates phishing based on inputting the inputs into the first neural network; and based on the first probability value indicating a phishing attack classification, inputting masked input vectors into the first neural network, wherein the masked input vectors comprise vectors of the inputs with one or more of the inputs masked; and determining importance scores of the inputs being correlated to the phishing attack classification based on second probability values obtained from inputting the masked input vectors into the first neural network.

2. The method of claim 1, wherein inputting the inputs into the first neural network comprises, embedding the inputs as a plurality of numerical vectors; and inputting the plurality of numerical vectors into the plurality of neural network blocks, wherein each numerical vector is input into a neural network block of the plurality of neural network blocks corresponding to the characteristic of the input of the numerical vector.

3. The method of claim 2, wherein embedding the inputs as a plurality of numerical vectors comprises embedding a subset of the inputs corresponding to URLs indicated in the first content at a same embedding layer that is distinct from embedding layers of those of the inputs not in the subset of inputs.

4. The method of claim 3, wherein the subset of the inputs corresponding to URLs comprises a URL input, a links input, a redirects input, and a resource input.

5. The method of claim 1, wherein processing the inputs with the plurality of neural network blocks comprises combining outputs of the plurality of neural network blocks in at least a dense layer of the first neural network to generate the first probability value.

6. The method of claim 1, wherein the inputs comprise a Document Object Model (DOM) tree input and the inline parsing to extract the DOM tree input comprises:

detecting a first opening tag of a first document element in the first content;

initializing a first node representing the first document element as a child of a second node in a tree data structure representing a DOM tree of the first content, wherein the second node represents a second document element preceding the first opening tag of the first document element in the first content;

traversing the tree data structure from the second node to the first node for generation of child nodes to the first node representing document elements proceeding the first opening tag of the first node in the first content; and based on a detecting a closing tag of the first document element, traversing the tree data structure from the first node to the second node for generation of child nodes to the second node representing document elements proceeding a second opening tag of the second document element in the first content.

7. The method of claim 1, wherein each of the masked input vectors comprises, for a corresponding input of the inputs, a vector with the input masked, wherein determining an importance score of the importance scores for the input comprises determining the importance score based, at least in part, a difference between the first probability value and a probability value of the second probability values corresponding to the input.

8. A non-transitory computer-readable medium having program code comprising:

instructions to generate a plurality of inputs corresponding to characteristics of first content from a HyperText Transfer Protocol (HTTP) response;

instructions to embed the plurality of inputs as a first plurality of numerical vectors;

a plurality of neural network blocks, wherein each neural network block comprises instructions to, receive the first plurality of numerical vectors at neural network blocks in the plurality of neural network blocks that correspond to respective inputs embedded as the first plurality of numerical vectors; and process the first plurality of numerical vectors in at least a convolutional layer; and a dense neural network block, wherein the dense neural network block comprises instructions to combine first outputs of the plurality of neural network blocks to generate a first probability value indicating a phishing classification of the plurality of inputs; and instructions to generate masked input vectors from the first plurality of numerical vectors, each masked input vector comprising the first plurality of numerical vectors having one or more numerical vectors corresponding to one or more of the plurality of inputs masked, wherein each neural network block of the plurality of neural network blocks further comprises instructions to, for each masked input vector of the masked input vectors, receive respective subsets of the masked input vector at respective subsets of the plurality of neural network blocks; and process the masked input vector in at least the convolutional layer, and wherein the dense neural network block further comprises instructions to combine second outputs of the plurality of neural network blocks to generate second probability values corresponding to importance scores of the plurality of inputs being correlated to the phishing classification.

9. The computer-readable medium of claim 8, wherein the instructions to embed the plurality of inputs as the first plurality of numerical vectors comprise instructions to embed a subset of the plurality of inputs comprising Uniform Resource Locators (URLs) indicated in the HTTP response with a same embedding layer.

10. The computer-readable medium of claim 9, wherein the subset of the plurality of inputs comprising URLs indicated in the HTTP response with a same embedding layer comprise a links input, a redirects input, a URL input, and a resource input.

11. The computer-readable medium of claim 8, wherein the instructions to generate the plurality of inputs from the HTTP response comprise instructions to inline parse one or more capture logs captured from the HTTP response to generate the plurality of inputs.

12. The computer-readable medium of claim 11, wherein the plurality of inputs comprises a Document Object Model (DOM) tree input.

13. The computer-readable medium of claim 12, further comprising instructions to, initialize a tree data structure corresponding to the DOM tree input that represents a DOM tree indicated in the captures logs; and populate the tree data structure with document elements indicated in the capture logs, wherein the instructions to populate the tree data structure comprise instructions to, based on detecting a first opening tag for a first document element in the capture logs, initialize a first node representing the first document element the tree data structure;

assign the first node representing the first document element as a child node of a second node in the tree data structure, wherein the second node represents a second document element preceding the first document element in the capture logs;

traverse the tree data structure from the second node representing the second document element to the first node representing the first document element for generation of child nodes to the first node corresponding to document elements proceeding the first opening tag of the first document element in the capture logs; and based on detecting a closing tag of the first document element in the capture logs, traverse the tree data structure to the second node representing the second document element for generation of child nodes to the second node representing document elements proceeding a second opening tag of the second document element.

14. The computer-readable medium of claim 8, wherein each neural network block of the plurality of neural network blocks comprises instructions to receive and process the first plurality of numerical vectors in parallel across each neural network block of the plurality of neural network blocks.

15. The computer-readable medium of claim 8, wherein each neural network block comprising instructions to process the first plurality of numerical vectors in at least a convolution layer comprises instructions to process the first plurality of numerical vectors in at least one of a max pooling layer and a flattening layer.

16. The computer-readable medium of claim 8, wherein the dense neural network block comprising instructions to combine outputs of the plurality of neural network blocks comprises instructions to process concatenated outputs of the plurality of neural network blocks in at least one of an input layer, a dropout layer, a dense layer, and a prediction layer.

17. The computer-readable medium of claim 8, wherein the instructions to generate the plurality of inputs corresponding to characteristics of first content from the HTTP response comprise instructions to, convert string vectors in the plurality of inputs to a second plurality of numerical vectors at vectorization layers; and embed the second plurality of numerical vectors as the first plurality of numerical vectors at embedding layers.

18. The computer-readable medium of claim 8, wherein the plurality of inputs comprises a JavaScript® input, a text input, and a HTTP header input.

19. An apparatus comprising:

a processor; and a computer-readable medium having instructions stored thereon that are executable by the processor to cause the apparatus to, inline parse capture logs of network traffic between a first endpoint device and a first firewall to extract inputs corresponding to characteristics of first content returned responsive to a query to a first Uniform Resource Locator (URL) by the first endpoint device as indicated in the capture logs;

for each subset of the inputs corresponding to a characteristic in the characteristics of the first content, pass the subset of the inputs to a neural network block in a plurality of neural network blocks arranged in parallel in a first neural network, wherein the neural network block and the subset of the inputs correspond to the characteristic of the first content; and process the subset of the inputs with the neural network block;

combine first outputs of processing the subsets of the inputs at the plurality of neural network blocks to generate a first probability value that the first content indicates phishing; and based, at least in part, on the first probability value indicating a phishing attack, generate masked input vectors comprising vectors of the inputs, each masked input vector having one or more of the inputs masked;

process the masked input vectors at the plurality of neural network blocks; and combine second outputs of processing the masked input vectors at the plurality of neural network blocks to generate second probability values corresponding to importance scores of the inputs being correlated to the indication of the phishing attack.

20. The apparatus of claim 19, wherein the instructions executable by the processor to cause the apparatus to, for each subset of the inputs corresponding to the characteristic in the characteristics of the first content, pass the subset of the inputs to the neural network block in the plurality of neural network blocks arranged in parallel in the first neural network comprise instructions to, embed the subset of the inputs as a plurality of numerical vectors; and pass the plurality of numerical vectors to the neural network block.

\* \* \* \* \*